Feb. 7, 1956
A. A. LIPTON
2,733,924
ARBOR WITH COLLET-SHAPED BODY
Filed April 26, 1954
2 Sheets-Sheet 1
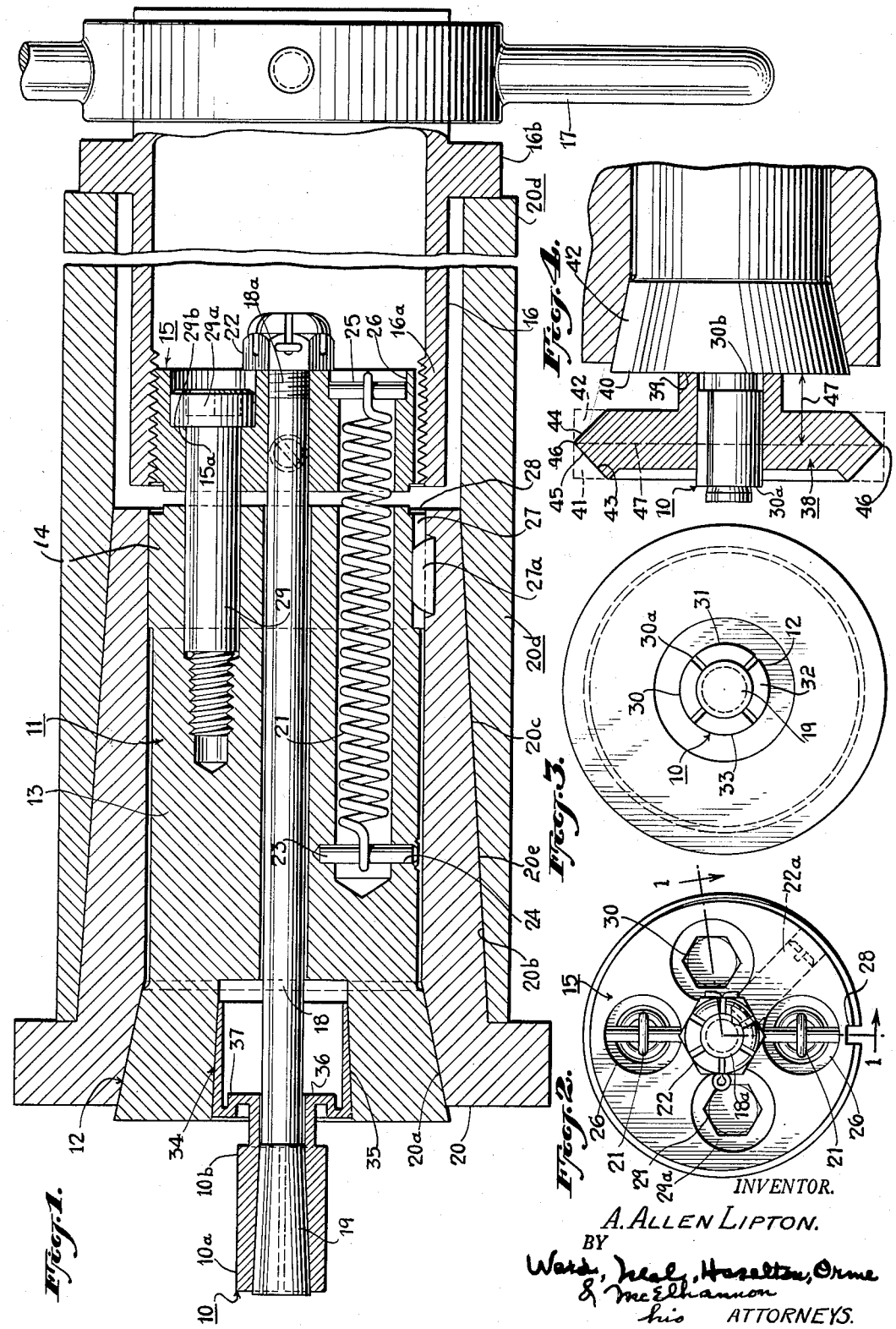
INVENTOR.
A. ALLEN LIPTON.
BY
Ward, Neal, Haselton, Orme
& McElhannon
his ATTORNEYS.

Feb. 7, 1956  A. A. LIPTON  2,733,924
ARBOR WITH COLLET-SHAPED BODY
Filed April 26, 1954  2 Sheets-Sheet 2

INVENTOR.
A. ALLEN LIPTON.
BY
Ward, Neal, Haselton, Orme
& McEthannon
his ATTORNEYS.

United States Patent Office 2,733,924
Patented Feb. 7, 1956

2,733,924

ARBOR WITH COLLET-SHAPED BODY

Abraham Allen Lipton, Rock Ridge, N. Y.

Application April 26, 1954, Serial No. 425,685

3 Claims. (Cl. 279—2)

This invention relates to arbors, and more particularly to arbors of the drawback expanding variety.

Arbors which have been heretofore suggested for expanding within a finished internal bore of a workpiece to hold same for machining operations have had little or no flexibility with respect to the adaptability thereof to a large number of machines. That is, such arbors heretofore suggested have been custom made for the particular machine with which they are to be used. For example, on metal working lathes, a drawback expanding arbor is of well known use and application. Such arbor is adapted for expanding and holding to a high degree of accuracy a workpiece by engaging the internal surface of a central bore thereof. However, such arbor normally has not been adapted for interchangeability from such metal working lathe to another machine tool, such as a milling machine or a grinding machine. Consequently, the particular workpiece has in the past been withdrawn from the arbor upon the particular machine tool, such as the metal lathe, and has been of necessity repositioned upon separate arbors upon the other machine tools, such as those aforementioned, for subsequent operations.

One of the objects of the present invention is to overcome the above defects by providing an arbor device which is secured to a collet-shaped body at the outer or head extremity of the latter, the arbor per se consisting of a plurality of expandable fingers which may constitute a split element fixed to the outer extremity of the collet body. The term "collet-shaped body" is used herein interchangeably with collet body and refers to a structure similar in size and general outline to a standard collet but preferably without the longitudinal slots formed therein near its head position. The collet body can be located within suitable collet adapters with a high degree of accuracy in the usual manner of standard collets. The arbor portion, also with a high degree of precision, is associated with the collet adapter. Such arbor or expandable elements maintain a constant and extremely precise relationship with the main collet body thereby providing a heretofore unattained interchangeability of expandable arbor elements with respect to their mounting structure and at the same time providing heretofore unattained adaptability of the arbor to a variety of machines, such as the aforementioned metal working lathe, milling machine, grinding machine, and special collet holders.

The expandable arbor elements are expanded under the influence of a taper headed draw-pin which extends through a central longitudinal passage within the collet body, the tapered head being positioned centrally within the arbor elements in such a manner that axial shifting of the draw-pin will expand the arbor elements outwardly to grasp the inner surfaces of a bore of a workpiece. The tapered head of the draw-pin thus is positioned at the outer extremity of the collet body. The inner extremity of such draw-pin is secured to a separate end piece which is threaded for the purpose of association with a conventional draw-bar. Suitable means are provided for holding the threaded end piece against angular motion with respect to the main body of the collet and also, if desired, a suitable limit-stop may be employed for limiting the extent to which the end piece may be separated from such collet body, thereby limiting the extent of expansion of the arbor element.

The above and further objects and novel features of the invention will more fully appear from the description given below when read in connection with the accompanying drawings, which form a part of the specification. However, it is to be expressly understood that the drawings are for purposes of illustration only and are not intended as a definition of the limits of the invention, reference for this latter purpose being had to the appended claims.

In the drawings:

Fig. 1 constitutes a side elevation, partly in section (taken substantially along line 1—1 of Fig. 2) and with parts broken away, of one form of arbor device embodying the present invention, such device being mounted within a collet adapter which in turn is mounted within the spindle of a machine tool;

Fig. 2 constitutes an end view of the collet body employed in the present invention;

Fig. 3 constitutes an end view from the opposite extremity of such body;

Fig. 4 is a fragmentary view of the arbor device shown in Fig. 1 illustrating it holding a workpiece by grasping the inner surfaces of a bore in such workpiece;

Figure 5:
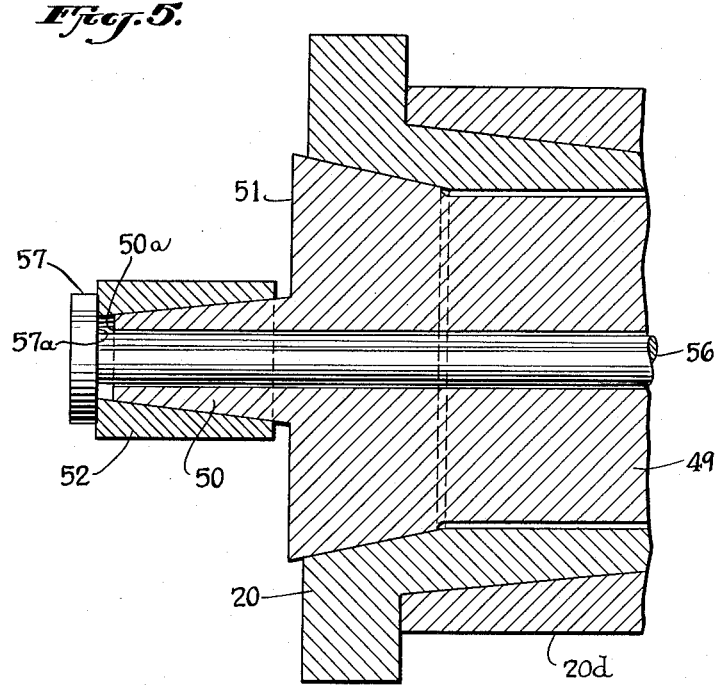
Fig. 5 is a fragmentary longitudinal sectional view of a second embodiment of the invention.

Referring to the drawings in greater detail, in Fig. 1 there is illustrated one form of the invention comprising an expandable arbor element 10 for engaging a workpiece internally. Such expandable arbor element 10 is secured to a standard collet-shaped body 11 consisting of a tapered head 12 and a cylindrical body portion 13, the latter having preferably at the inner or rear extremity thereof a cylindrical bearing surface 14 machined to high precision. A threaded end piece 15 is associated with the apparatus for providing a means for threadedly engaging a draw-bar 16 thereby axially to shift the threaded end piece in response to the turning of a handle 17, the draw-bar 16 having a suitable internally threaded extremity, as at 16a, for engaging the externally threaded end piece 15. Secured to the threaded end piece 15 is a draw-pin 18 having a tapered head 19 centrally disposed within the arbor portion 10, the latter having a correspondingly tapered inner surface for receiving the tapered head 19. The collet body 11 is placed within a collet adapter 20 wherein it is positionable with a high degree of accuracy when withdrawn therein to the right, as viewed in Fig. 1, under the influence of the draw-bar 16 against the pressure of springs 21. The latter urges the threaded end piece 15 towards the collet body 11. Preferably there are at least two such springs 21 each of which is positioned within suitable coaxial bores respectively formed in the collet body 11 and the end piece 15.

The drawing to the right, as viewed in Fig. 1 of the end piece 15, by means of the draw-bar 16, will urge the tapered head 12 of the collet body into accurate engagement with the outwardly flared mouth 20a of the collet adapter 20, the accurately machined rear bearing surface 14 of the collet body 11 positioning such extremity thereof accurately with respect to the precisely machined inner bore surface 20e of such collet adapter. Also such "drawing to the right" (Fig. 1) of end piece 15 urges a tapered outer surface 20b of adapter 20 into accurate position with a correspondingly tapered opening 20c of a machine tool spindle 20d.

I have found it desirable to associate the inner extremity 18a of the draw-pin 18 with the end piece 15 by positioning the latter axially on the pin 18 by means of a lock nut 22, and by locking the end piece in such axial position by a set screw 22a.

Each of the springs 21 is secured to the collet body 11 by means of a pin, as at 23, positioned within a bore 24 formed in the collet body 11. The opposite extremity of such spring is secured in place by means of a pin 25 which is positioned within a suitable recess 26 formed in the rear end of the threaded end piece 15.

It is desirable to associate the end piece 15 with the collet body 11 in such a way that one will not twist relative to the other whereby a holding of the collet body 11 against angular shifting will also hold the end piece 15 against such shifting. This will permit axial movement of the end piece 15 or drawing back thereof relative to the collet body 11 under the influence of the draw-bar 16 when the latter threadedly engages such end piece. Thus a turning of the handle 17 will cause a collar 16b to engage the right-hand extremity (Fig. 1) of the spindle 20d thereby to prevent further inward axial movement of the draw-bar 16 and causing the end piece 15 to move relative to the collet body 11 in response to the turning of the handle 17.

Furthermore, it is desirable to hold the end piece 15 against angular motion with respect to the collet body in order that two aligned keyways 27 and 28, respectively in the collet body and the threaded end piece, may be maintained at all times in alignment, thereby to permit easy insertion and withdrawal of the collet body 11 within the collet adapter 20.

The means for so holding the end piece 15 against angular motion with respect to the collet body 11 comprises, in the form shown, a pair of so-called stripper bolts 29 and 30 (Fig. 2), the former of which is shown in Fig. 1. Each of the stripper bolts performs the dual function of: (a) so restraining the end piece and collet body against relative angular motion and thus serving as a guide for its axial motion, and (b) in addition thereto, each head, for example 29a, of the stripper bolts acts as a limit-stop to the axial motion of the threaded end piece 15 with respect to the collet body 11. That is, such head 29a is provided with a shoulder 29b which engages a cooperating shoulder 15a formed in the bore of the end piece 15 through which the bolt 29 extends.

The aforementioned aligned keyways 27 and 28 are for the purpose of accommodating a key 27a which is secured within the bore of the collet adapter 20 and is adapted for transmitting torque therefrom to the main body 11 of the collet. In order for the key 27a to engage the keyway 27, it is, of course, necessary for the collet 11 to be inserted fully within the collet adapter in the position shown in Fig. 1 wherein the aligned keyway 28 in the end piece 15 permits access of the key 27a to such keyway 27.

Reverting now to Figs. 1 and 3, the arbor element 10, including the expandable fingers thereof, will now be described. This element may also be referred to as a split element and consists of a plurality of fingers 30–33, inclusive, which are coaxial with the longitudinally extending bore through the main collet body. Such fingers are separated by slots as a 30a which extend to the base of the fingers, that is, to the point 30b (Fig. 4) substantially level with the flat outer face of the tapered head 12. If desired, such expandable fingers 30 may be formed integrally with the main collet body 11 but I have found it preferable to form the arbor element separately in the manner shown in Fig. 1 wherein such arbor element is constituted by a tapered sleeve 34 to which is secured the several expandable fingers 30–33, inclusive. The tapered sleeve 34 is formed to fit with precision within a cooperating recess 35 formed in the outer or left-hand face of the tapered collet head 12. Such recess flares outwardly to receive the sleeve 34 and the latter may be firmly secured therein, for example, by cooling same to a temperature substantially below that of the collet head 12 and fitting same therein and permitting them to reach the same temperature, that is, permitting the sleeve 34 to expand to room temperature.

Regardless of the manner of securing the arbor element 10 to the collet body 11, such arbor element is at all times in a constant and accurately aligned relationship with the main collet body. It is the precision of this relationship with the collet body, in addition to the fact that the latter body can be used in a variety of machines without special attachment, that comprises one of the main advantages of the invention. The collet body is locatable within the collet adapter with a high degree of accuracy thereby insuring that the expandable elements or arbor element 10 is located with a similar high degree of precision with respect to the collet adapter and hence with respect to the axis of rotation of the metal working tool. Thus a work-piece can subsequently be remounted upon such collet arbor after the arbor has been shifted from one machine to another, thereby insuring a high degree of accuracy for all machining operations upon the workpiece despite the shifting of the arbor from one machine to another.

In order to facilitate the gripping of the work-piece by the expandable fingers 30–33, I have found it desirable to employ special means for associating such fingers with the collet body to assist such fingers to expand an equal distance outwardly, both at the outer and inner extremities thereof. That is, when the draw-pin 18 is pulled to the right, as viewed in Fig. 1, it is desirable for the outer extremity 10a to expand outwardly the same distance as the inner extremity 10b. This can be assisted or facilitated by forming a concentric corrugation at 36 in the metal inter-connecting the supporting sleeve 34 with the base of the fingers 30–33. Such corrugation 36 is concentric with the central axis of the collet body 11, and under the influence of the tapered head 19 of the pin 18 permits a substantial straight line outward radial movement of, for example, a point 37 and of the region 10b of the arbor element 10.

Reverting now to the manner of associating the threaded end piece 15 with the main collet body 11, such elements are pulled together by the springs 21 so that normally one is in engagement with the other. Furthermore, they are guided by the bolts 29 to avoid relative angular movement and also to maintain the keyways 27 and 28 in alignment. Furthermore, the draw-bar 16 can pull the collet body into accurate position within the collet adapter by tensioning the springs 21 resulting from the turning of the handle 17. The heads of the bolts 29 and 30 prevent excessive expansion of the arbor element 10 by restricting the rearward movement of the threaded end piece 15.

In operation, the collet body 11 is inserted manually within the collet adapter 20. The collet body is held in position while the draw-bar 16 is turned whereby its threaded extremity 16a engages the external threads of the end piece 15, thereby to tension the springs 21 and to draw the collet body into the adapter 20 thereby causing the tapered head 12 to engage with a high degree of precision the corresponding tapered and outwardly flared opening 20a comprising the mouth of the collet adapter. The adapter 20 is thus urged into snug engagement with the spindle 20d. The collet body 11 is so aligned with the adapter key 27a that the keyways 28 and 27 successively accommodate the key 27 and the latter is positioned for operation, as shown in Fig. 1, whereupon the torque of the turning collet adapter 20 is transmitted to the body 11 and thence to the workpiece. Adequate turning of the handle 17 will draw the tapered head 19 to the right, as shown in Fig. 1, thereby expanding the arbor element 10 and accurately grasping the workpiece in such a manner that it is positioned with a high degree of precision with respect to said collet adapter and the spindle 20d.

Referring to Fig. 4, one advantage of the present invention is illustrated with respect to the ability of the device to accommodate a succession of workpieces in a common and highly accurate position. For example, a gear blank 38 may be positioned upon the collet arbor, as shown, and thrust to its farthermost position to the right wherein the surface 39 thereof is in engagement with outer face 40 of the tapered head 12. The initial form of the gear blank 38 is indicated by the dotted lines of this figure. After such positioning of the workpiece, the metal thereof is reduced by a suitable machining operation to remove the peripheral portion 41 of triangular cross-section and thereafter another peripheral portion at 42 can be removed thereby preparing the gear blank for the formation of teeth in the region 43 thereby to create a bevel gear. The intersection of the surfaces 44 and 45 resulting from such machining operations occurs at a peripheral line 46 which defines a plane 47 which is spaced from the face 40 of the collet head by a dimension 48.

In order to achieve uniformity with respect to all such bevel gears, it is highly desirable that the dimension 48 be constant with respect to the succession of workpieces which are so machined. Such uniformity is easily achieved by the present invention, particularly in view of the fact that the motion of the expandable elements 30-33 is only outward or radial, and is without any axial component or at least without any appreciable axial component worthy of consideration. Consequently the workpieces cannot be shifted axially as a result of the expansion of the arbor element 10. It is unnecessary always to employ the face 40 of the tapered head 12 as a limit-stop or reference surface for the workpieces, it being understood that any suitable limit-stop can be so employed.

Thus by means of the present invention a common reference position can be easily achieved for all workpieces.

Figure 6:
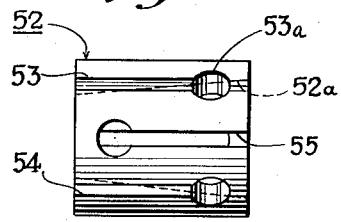
Fig. 6 is a side view of an expandable sleeve element employed in the embodiment of Fig. 5.

Referring now to Figures 5 and 6, a second embodiment of the invention will now be described, which is identical in all respects to the embodiment of Fig. 1 with the exception of the construction of the arbor or expendable element. Thus in the embodiment of Fig. 5 a collet body 49 is employed which is identical in shape to the collet body 11, above described, with the exception that a tapered or frusto-conical member 50 is secured to the outer face 51 thereof and is embraced by an expandable sleeve element 52, the latter being slidable over the member 50. The sleeve, as is well shown in Fig. 5, is provided with a plurality of longitudinal slots to permit expansion or contraction thereof in response to such sliding. One group of such slots, for example 53, 54, is formed with the mouths thereof at the left-hand extremity of the sleeve element, and another group of slots typified by 55 is formed with the mouths thereof in the opposite or right-hand extremity of the sleeve element. The latter has a tapered or conical bore 52a which is designed for fitting with high precision over the frusto-conical element 50. Consequently, a sliding of the sleeve 52 over the frusto-conical element 50 to the right, as viewed in Fig. 5, will cause such sleeve to expand and to engage the bore of a workpiece (not shown).

The sleeve 52 normally is in its unexpanded condition, as in the position shown in Fig. 5 is expandable under the influence of a draw-pin 56 having a head 57 of smaller diameter than that of the sleeve 52. Urging the draw-pin 56 to the right while holding the collet body 49 axially stationary, obviously will thrust the frusto-conical element further into the bore of the sleeve 52 thereby expanding the latter. The aforedescribed stripper bolts 29 and 30 are effective to limit the extent of the relative axial movement of the draw-pin 56 and the collet body 49.

At the outset of the movement of the head 57, it is clear that there must be adequate clearance between the end surface 57a thereof and the peak 50a of the frusto-conical element 50 in order to permit the desired relative axial movement and expansion of the sleeve. The sleeve 52 after having been so expanded will revert to its position shown in Fig. 5 in response to the repositioning of the head 57 to the position shown in such figure.

If desired, the innermost extremities of the above-mentioned slots, for example 53, 54 and 55, can be formed by cylindrical bores as at 53a.

What is claimed is:

1. In apparatus of the class described, a collet body having secured thereto a split portion coaxial therewith and at the outer extremity thereof; a separate threaded end piece for said body; said body and split portion having a central longitudinal passage therethrough; a draw-pin extending through said passage and secured to said threaded end piece, said pin having a tapered head for expanding said split portion in response to axial movement of said pin in said passage; resilient means for urging said end piece towards said body and guide means for holding said body and end piece against relative angular movement.

2. In apparatus of the class described, a collet body; a split element coaxial with and secured to said body at the outer end thereof, the latter and said split element having a common central longitudinal passage therethrough; an end piece for said body connected at the opposite end thereof for axial motion relative thereto; means for holding said end piece and body against relative angular movement; and a draw-pin positioned in said passage, said pin having a tapered head centrally disposed within said split element, the opposite extremity of said pin being secured to said end piece; and resilient means for urging said body and end piece together.

3. In apparatus of the class described, a collet-shaped body member comprising two relatively movable sections, a first section having a frusto-conical head and a cylindrical body region, and a second section connected to said first section for movement along the longitudinal axis of the first member; said first section having a centrally disposed passage extending axially therethrough; a draw-pin extending through such passage and having a tapered head at one extremity and being secured to said second section at the other extremity thereof; a plurality of fingers secured to said frusto-conical head and disposed coaxially about said tapered head, the inner surfaces of said fingers forming as a group correspondingly tapered bearing surfaces for cooperating with the tapered head of said draw-pin to expand said fingers radially in response to separation of said sections; and means for preventing relative angular movement of said sections.

References Cited in the file of this patent

UNITED STATES PATENTS

| | | |
|---|---|---|
| 2,345,091 | Brace et al. | Mar. 28, 1944 |
| 2,435,480 | Tuttle | Feb. 3, 1948 |
| 2,469,873 | Ernest | May 10, 1949 |
| 2,494,899 | Gross | Jan. 17, 1950 |
| 2,573,928 | Peter | Nov. 6, 1951 |
| 2,601,419 | Spahn | June 24, 1952 |

FOREIGN PATENTS

| | | |
|---|---|---|
| 437,797 | Great Britain | Nov. 5, 1935 |